(12) United States Patent
Bridger

(10) Patent No.: US 12,523,994 B2
(45) Date of Patent: Jan. 13, 2026

(54) METHOD FOR HANDLING PRODUCT SETTINGS OF OPERATING PARAMETERS OF A PRODUCT INSPECTION SYSTEM, PRODUCT INSPECTION SYSTEM AND COMPUTER PROGRAM

(71) Applicant: Mettler-Toledo Safeline X-Ray Limited, Royston (GB)

(72) Inventor: Nick Bridger, Kettering (GB)

(73) Assignee: Mettler-Toledo Safeline X-Ray Limited, Royston (GB)

(*) Notice: Subject to any disclaimer, the term of this patent is extended or adjusted under 35 U.S.C. 154(b) by 407 days.

(21) Appl. No.: 18/115,808

(22) Filed: Mar. 1, 2023

(65) Prior Publication Data

US 2023/0288919 A1 Sep. 14, 2023

(30) Foreign Application Priority Data

Mar. 8, 2022 (EP) .................................... 22160718

(51) Int. Cl.
*G05B 19/418* (2006.01)
(52) U.S. Cl.
CPC .............. *G05B 19/41875* (2013.01); *G05B 2219/37439* (2013.01)
(58) Field of Classification Search
None
See application file for complete search history.

(56) References Cited

U.S. PATENT DOCUMENTS

| 10,853,469 | B1 | 12/2020 | McNamara et al. |
| 10,919,076 | B2 | 2/2021 | Ackley et al. |
| 2006/0026672 | A1* | 2/2006 | Braun .................. G05B 19/042 726/9 |
| 2009/0119500 | A1 | 5/2009 | Roth et al. |
| 2011/0102841 | A1* | 5/2011 | Morita ............... H04N 1/00408 358/1.15 |
| 2011/0156865 | A1* | 6/2011 | Baek .................. G07C 9/00563 340/5.53 |

(Continued)

FOREIGN PATENT DOCUMENTS

| CA | 3018916 A1 | 3/2020 | |
| JP | 2014059201 A | * 4/2014 | |
| JP | 6871680 B2 | * 5/2021 | ......... G06F 21/6218 |

*Primary Examiner* — Jason Lin
(74) *Attorney, Agent, or Firm* — Standley Law Group LLP; Jeffrey S. Standley; Adam J. Smith

(57) ABSTRACT

Methods and related systems for handling product settings of operating parameters of a product inspection system are disclosed. A radiation unit for causing radiation to impinge onto a subject product and a detector unit for detecting the radiation transmitted through or reflected from the subject product are controlled by a control unit. Validated status of validated product settings associated with a selected product are displayed at a visual display unit and access for modifying at least one of the validated product settings is denied. Removal of the validated status via user input into an input unit is requested. In response, a user sign-in request is displayed and received. In response to a successful user sign-in, an unvalidated status of the product settings associated with the selected product is displayed and access for modifying at least one of the product settings associated with the selected product is permitted.

15 Claims, 9 Drawing Sheets

(56) References Cited

U.S. PATENT DOCUMENTS

| | | | | |
|---|---|---|---|---|
| 2012/0047024 | A1* | 2/2012 | Urban | G06Q 30/02 |
| | | | | 705/14.69 |
| 2014/0304805 | A1* | 10/2014 | Mitsui | G06F 21/31 |
| | | | | 726/16 |
| 2016/0295034 | A1* | 10/2016 | Miyazawa | H04N 1/00411 |
| 2017/0094121 | A1* | 3/2017 | Mizuno | H04N 1/4433 |
| 2017/0316840 | A1* | 11/2017 | Abbott | G21C 1/03 |
| 2017/0331965 | A1* | 11/2017 | Ikeda | G06F 3/1287 |
| 2019/0004751 | A1* | 1/2019 | Ikeda | G06F 3/1286 |
| 2019/0304082 | A1* | 10/2019 | Tokashiki | H04L 63/101 |
| 2020/0265226 | A1* | 8/2020 | Tsugawa | G06F 21/35 |

\* cited by examiner

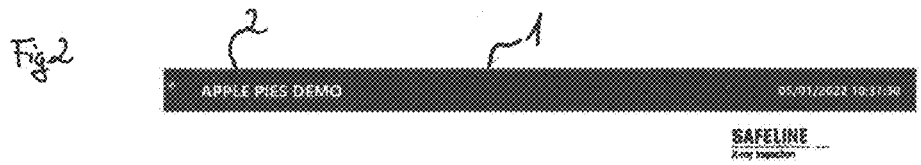
Fig. 2
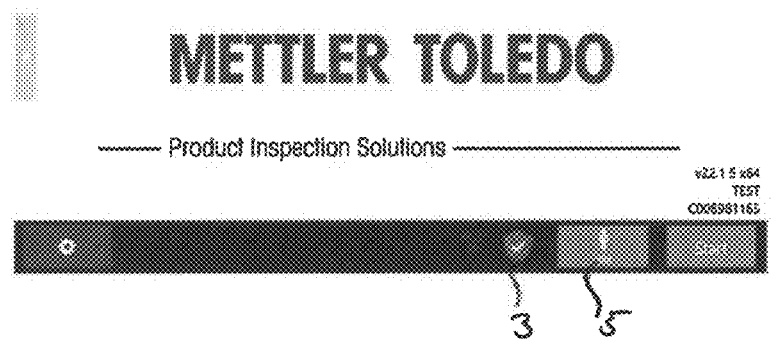
Fig. 3
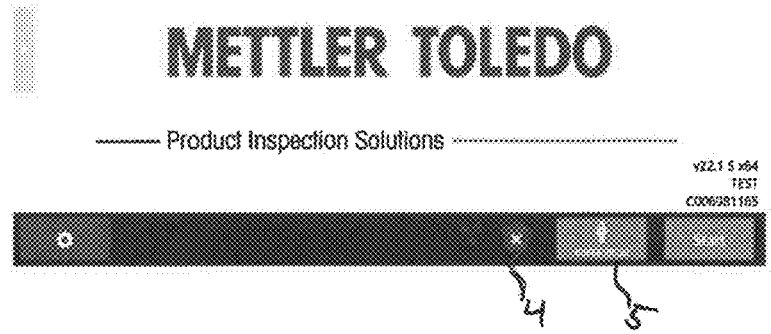
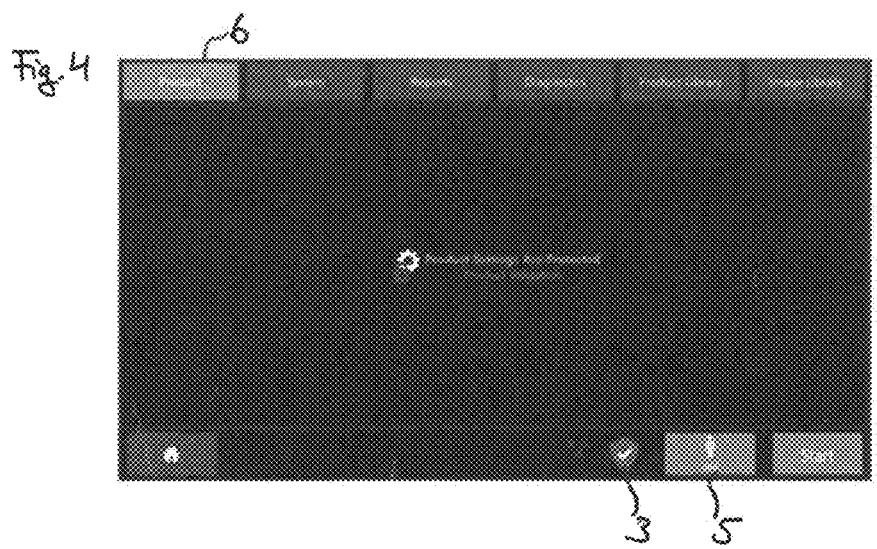
Fig. 4

Fig. 8
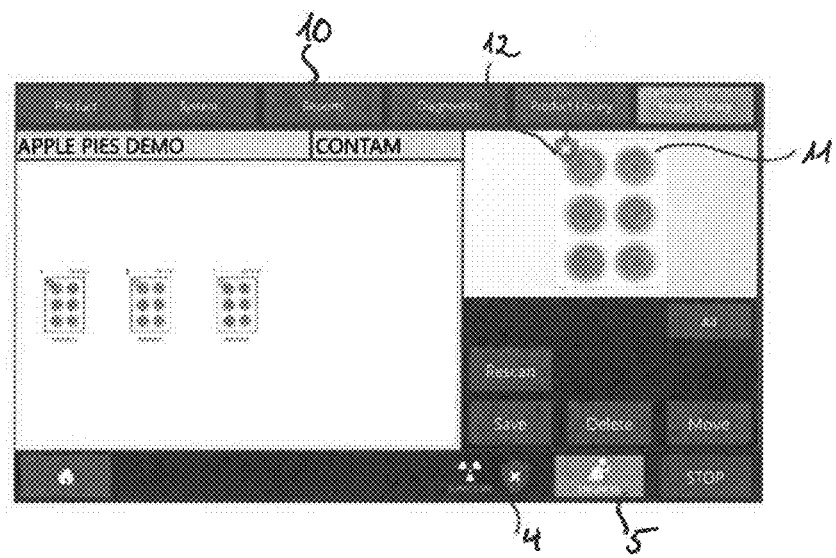
Fig. 9
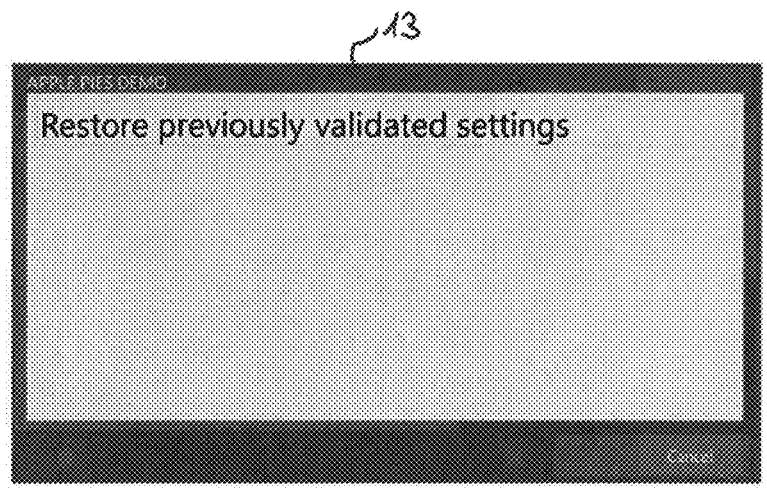
Fig. 10
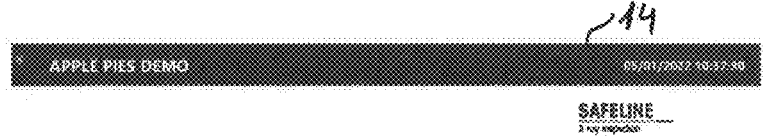

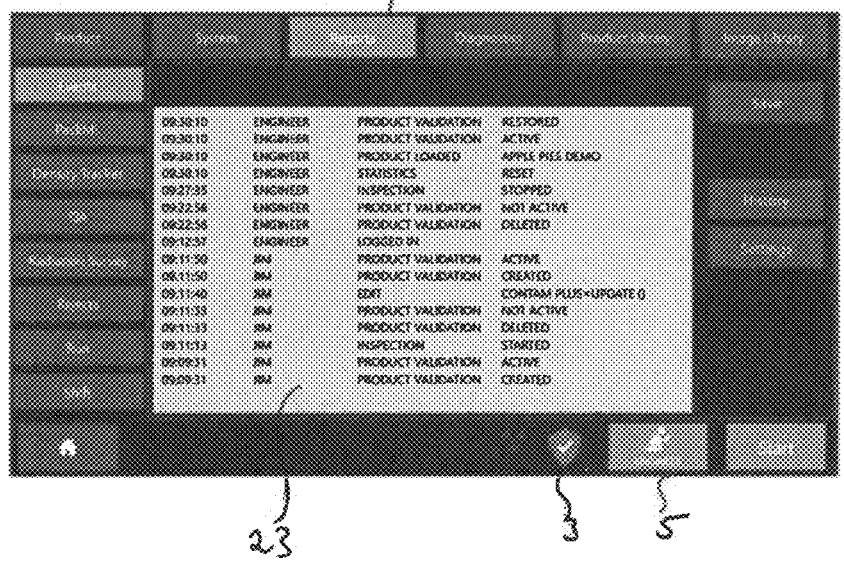

METHOD FOR HANDLING PRODUCT SETTINGS OF OPERATING PARAMETERS OF A PRODUCT INSPECTION SYSTEM, PRODUCT INSPECTION SYSTEM AND COMPUTER PROGRAM

CROSS-REFERENCE TO RELATED APPLICATIONS

This application claims the benefit of European Patent Application No. 22160718.7 filed Mar. 8, 2022, the disclosures of which are hereby incorporated by reference as if fully restated herein.

TECHNICAL FIELD

The present invention is related to a method for handling product settings of operating parameters of a product inspection system, to a product inspection system and to a computer program.

BACKGROUND ART

A product inspection system may comprise an electronic control unit, a radiation unit controlled by said control unit for causing radiation to impinge onto a subject product, a detector unit controlled by said control unit for detecting the radiation transmitted through or reflected from said subject product, a visual display unit in communication with said control unit and an input unit in communication with said control unit. Such product inspection systems are known in the art and may be used in various industries to guarantee product safety and quality. For example, the product inspection system may detect that the subject product does not comply with certain standards or is defective. E.g., a contaminant may be detected in the subject product. Such a product may then be ejected by an eject unit.

The operating state of such a product inspection system may be determined by a plurality of operating parameters. The operating parameters may include, for example, the intensity of the radiation emitted by the radiation unit, the duration of the irradiation, etc. The settings of these operating parameters may be tuneable by a user. In particular, different product settings of the operating parameters may be used for different products to thereby optimize the inspection process.

Due to the individuality of product inspection systems and the complexity of the settings of the operation parameters, tuning and tweaking the product settings for a selected product is a difficult and time-consuming task. This task is generally carried out by a knowledgeable and skilled operator. Once a carefully adjusted setup of the product settings is achieved, the product settings may be validated by an authorized validator. Generally, it is desirable, that the validated product settings are protected against accidental or unauthorized change. Furthermore, when the performance of the product inspection system changes, it is desirable to know whether this is due to a change of the product settings or due to some other external factor.

To this end, various methods are known in the art. For example, US 2020/0265226 A1 discloses a food product processing device and a device management method, which comprises an authentication part. The authentication part comprises an iris imaging device to authenticate a user of an X-ray inspection device of the food product processing device in order to perform a sensitivity adjustment process of the X-ray inspection device.

U.S. Pat. No. 10,853,469 B1 discloses systems and techniques for managing a user interface provided to a user of a materials handling facility. Here, the interface can be locked based on the threshold distance or standing orientation of the user to protect any unauthorized access.

U.S. Pat. No. 10,919,076 B2 discloses an inspection system comprising a user interface which supports multiple user log-ins. The password requirements and level of access for each user may be customized to meet any customer's standard procedures.

CA 3018916 A1 relates to a system and a method for delegating access to a protected resource comprising a graphical user interface manager. The history of access requests and approval decisions are stored and the changes made are also stored with time stamps.

While the systems and methods disclosed in the prior art may allow to protect and trace access to product settings of a product inspection device, they may not be ideal with regard to the requirements and the operability of a product inspection system in a factory environment.

Thus, it is an object of the present invention to provide a method for handling product settings of operating parameters of a product inspection system, a product inspection system and a computer program which allow handling of product settings of operating parameters of a product inspection system with high operability in a factory environment.

SUMMARY OF INVENTION

According to a first aspect of the present invention, there is provided a method for handling product settings of operating parameters of a product inspection system, said product inspection system comprising an electronic control unit, a radiation unit controlled by said control unit for causing radiation to impinge onto a subject product, a detector unit controlled by said control unit for detecting the radiation transmitted through or reflected from said subject product, a visual display unit in communication with said control unit and an input unit in communication with said control unit, the method comprising:

Step 1: displaying a first on-screen representation of a validated status of validated product settings associated with a selected product on the visual display unit and denying access for modifying at least one of the validated product settings associated with the selected product;

Step 2: requesting removal of the validated status via a user input into the input unit;

Step 3: requesting, by the electronic control unit, in response to the removal request, a user sign-in, said user sign-in request being displayed in a second on-screen representation on the visual display unit;

Step 4: entering a user sign-in via a user input into the input unit;

Step 5: in response to a successful user sign-in operation, displaying a third on-screen representation of an unvalidated status of the product settings associated with the selected product on the visual display unit and permitting access for modifying at least one of the product settings associated with the selected product.

According to the first aspect of the present invention, there is provided a method for handling product settings of operating parameters of a product inspection system. The product inspection system may be adapted for use in various industries, for example in the food industry. In such an example, the subject product may be a food product.

The radiation source is adapted to emit radiation. The radiation may be, for example, X-ray radiation, visible light, infrared radiation, ultraviolet radiation, near infrared radiation, etc. The detector unit is suitable for detecting the radiation transmitted through or reflected from the subject product.

The product inspection system further comprises a visual display unit, for example a screen. Furthermore, the product inspection system comprises an input unit in communication with the control unit. In one embodiment, the input unit and the display unit may include or may be part of a touch screen.

The product inspection system further comprises an electronic control unit. The electronic control unit controls the radiation unit and the detector unit and is in communication with the visual display unit and the input unit. The electronic control unit may preferably comprise a processor.

In one example, the product inspection system may further comprise a belt conveyor for conveying the subject product and/or an eject unit for ejecting products.

The operating state of the product inspection system may be determined by a plurality of operating parameters. The operating parameters may be related to or include, but are not limited to, e.g., a belt speed of the belt conveyor, a wavelength and/or an intensity of the radiation emitted by the radiation source, a duration of the irradiation, a pack length of the subject product, a pack gap between two subject products, etc. The settings of the operating parameters may be tuneable by a user.

The method according to the first aspect of the present invention comprises:

Step 1: displaying a first on-screen representation of a validated status of validated product settings associated with a selected product on the visual display unit and denying access for modifying at least one of the validated product settings associated with the selected product.

The settings of the operating parameters associated with a product are denoted as product settings. The product settings of the selected product may be used when inspecting the associated selected product with the product inspection system. In one embodiment, the product settings associated with two different products may be different from each other. The product settings may be tuneable by a user. In one embodiment, the product settings of a selected product may be loaded from a storage medium. In one example, the selected product may be selected by the user by a user input into the input unit and the associated product settings may be loaded from a storage medium.

The product settings of the operating parameters of a selected product may be validated by a validator in one example. In this case, the product settings may be associated with a validated status. The validated status is displayed in a first on-screen representation, e.g., via an icon on the visual display unit. The validated status may be displayed together with the product name in one embodiment. Access for modifying the product settings is denied when the first on-screen representation is displayed. In this way, the user is informed about the validated status via a visual indicator and the validated product settings are protected against any modification. The validated status may thus be understood as a protected validated status. According to the method, at least one of the product settings, for example all or only a subset of the product settings associated with a product, may be validated and protected against modification.

In one embodiment, product settings of a selected product may not be associated with a validated status, e.g., since they have not been validated by a validator. These product settings may be associated with an unvalidated status. In case that such a product is selected for inspection, the unvalidated status may be displayed in an on-screen representation on the display unit. In one example, access for modifying at least one of the product settings associated with an unvalidated status is permitted.

The method further comprises step 2: requesting removal of the validated status via a user input into the input unit. That is, when the user wishes to modify at least one of the product settings, a corresponding user input into the input unit is required. For example, in the case where the product inspection system comprises a touch screen comprising the visual display unit and the input unit, and the validated status is displayed as an icon on the touch screen, the user may touch said icon to request removal of the validated status.

Then, in step 3 of the method according to the first aspect of the present invention, the control unit requests, in response to the removal request, a user sign-in, said user sign-in request being displayed in a second on-screen representation on the visual display unit. For example, the second on-screen representation may comprise a request for entering a username. In one embodiment, a list of usernames of users who are authorized to sign-in may be displayed in the second on-screen representation. In one embodiment, only users with certain access rights may be able to sign in.

For the user sign-in the user must confirm their identity. This may be done in step 4: entering a user sign-in via a user input into the input unit. This may be done in one embodiment by entering user sign-in data via a user input into the input unit. For example, the user may enter their username via the input unit upon a request for entering a username displayed in the second on-screen representation. In an embodiment where a list of usernames is displayed in the second on-screen representation, the user may choose their name via an input into the input unit. Additionally, or alternatively, entering the user sign-in may include entering a password in one example. Different passwords may be associated with different users. In an example where the product inspection system comprises a touch screen comprising the visual display unit and the input unit or where the touch screen is part of the visual display unit and the input unit, the user may, e.g., touch the visualization of their name on the touch screen for entering the user sign-in.

The method further comprises step 5: in response to a successful user sign-in operation, displaying a third on-screen representation of an unvalidated status of the product settings associated with the selected product on the visual display unit and permitting access for modifying at least one of the product settings associated with the selected product.

The unvalidated status may be displayed, for example, via a special icon on the visual display unit. Displaying the unvalidated status may have the effect of an alarm function, as the user is informed about the possibility to access and modify the product settings.

According to the method of the first aspect of the present invention, when the first on-screen representation of the validated status of the validated product settings is displayed on the visual display unit, the validated product settings are protected against modification. No user, not even a validator of the product settings has access to the product settings for modification. If access to the product settings for modification is desired, the steps 2 to 4 of the present method must be carried out. This results in a removal of the validated status of the product settings. The product settings have then an unvalidated status and access for modifying at least one of the product settings is permitted.

The method according to the first aspect of the present invention provides thus a safe and operable method for handling product settings which is easy to operate in a factory environment. The method according to the first aspect of the present invention provides a mechanism to protect all product settings from being changed and provides a visual indicator to confirm that the product inspection system is running in a known qualified state determined by validated product settings. The method according to the first aspect of the present invention allows to protect the validated product settings from any changes, meaning that should system performance change at a later date, then it is clear that an external change is the cause and the product settings cannot be easily tweaked to chase these changes. In case where a customer factory acceptance test (FAT) has been executed and a final setup of the product settings of the operating parameters was used and validated, one can hence "seal" that setup and indicate if the current product settings comply with that validated condition. For example, if the FAT was performed on a product inspection system at the manufacturer site before shipment to the customer site, one may now know if the product settings were changed later on and may explain why performance has been lost or adjusted. Instead of changing product settings the installer should then ensure that the external conditions are identical to the original test environment.

In one embodiment of the method according to the first aspect of the present invention, the method may further comprise:

Step 6: after the access permission of step 5, modifying at least one of the product settings associated with the selected product via a user input into the input unit. That is, the user may change at least one of the product settings to which access for modifying was denied in step 1. For example, the user may try to account for changes in the product composition or changes in the product presentation, for example the belt speed, and in particular when the performance of the product inspection system has deteriorated.

After the modification, it may prove that the modifications are not required long-term and an issue, e.g., a reduced performance of the product inspection system, may have been solved in another way. Thus, another embodiment of the method according to the first aspect of the present invention may further comprise:

after the modification of the at least one of the product settings in step 6, restoring the validated product settings before the modification, displaying a fifth on-screen representation of the validated status of the restored validated product settings associated with the selected product on the visual display unit and denying access for modifying at least one of the validated product settings associated with the selected product. Preferably, the restoration of the product settings before the modification may be in response to an input of a restoration request by the user into the input unit. For example, when the unvalidated status is displayed via an icon on the visual display unit, the user may click on the icon. This may result in requesting, by the electronic control unit, whether the validated product settings before the modification should be restored, said request being displayed in an on-screen representation on the visual display unit. The user may confirm the restoration of the validated product settings via a user input into the input unit. This may result in displaying the fifth on-screen representation and in denying access for modifying any product settings associated with the selected product.

Alternatively, the modified product settings may be deemed to be required long-term. Thus, the method according to the first aspect of the present invention may further comprise:

after the modification of the at least one of the product settings in step 6, log-in of an authorized validator having validator rights by entering a validator log-in via an input into the input unit;

after a successful log-in operation of the validator, requesting a creation of a new validation by the validator by entering a validation request into the input unit;

in response to the validation request operation, displaying a fourth on-screen representation of the validated status of the modified product settings of the selected product on the visual display unit and denying access for modifying at least one of the product settings associated with the selected product.

According to this embodiment, access to all or only a subset of the product settings may be denied.

In one example, entering the validator log-in may comprise entering of validator log-in data of the validator. The validator log-in data may comprise a username in one example. Additionally, or alternatively, the validator log-in data may comprise a password in one example.

In one embodiment, the validator may log in while the user is signed in. The validator may be different from the user in one example.

An authorized validator having validator rights may be deemed to be competent and may thus be the authority who can declare that the product settings have been validated. This includes in one embodiment that a full validation of the system performance is performed and it is checked that all targets are met. Only a validator, i.e., a user having validator rights, may carry out a validation of the modified product settings. The modified product settings may then be used for product inspection.

The fourth on-screen representation may be identical or similar to the first on-screen representation in one embodiment. However, the fourth on-screen representation may also be different from the first on-screen representation in one example.

In one embodiment of the method according to the first aspect of the present invention, the method may further comprise:

assigning validator rights to and/or withdrawing validator rights from at least one user by an authorized administrator via an input into the input unit. Thereby, a new validator may be authorized or an authorized validator may lose their validator rights.

In another embodiment of the method according to the first aspect of the present invention, the method may further comprise:

storing data identifying the user and/or the validator who has been modifying and/or restoring and/or validating the product settings and/or changing the validation status of the product settings in an event log on an electronic event log storage medium. The validation status may include the validated status and the unvalidated status. Changing the validation status may, e.g., be due to the successful user sign-in operation of step 5 but is not limited to this. Preferably, the electronic event log storage medium may be part of the product inspection system. In one example, the event log storage medium may be permanently affixed to the product inspection system, e.g., as a hard disc. In an alternative embodiment, the event log storage medium may be a removable storage medium, e.g., a USB stick. In one embodiment, the electronic event log storage medium may be a cloud storage. The data stored in the event log on the event log storage medium may for example include a username of the user and/or the validator who has performed an operation (e.g., modifying and/or restoring and/or validating the product settings and/or changing the validation status) on the product settings. Furthermore, data identifying the operation on the product settings, e.g., data identifying whether a modification and/or a restoration and/or a validation of the product settings and/or a change of the validation status was performed, may be stored in the event log. In one example, said data may be provided with a time stamp indicating the time of the operation. The data stored in the event log may be accessible via an input into the input unit in one embodiment. In one embodiment, the data may be displayed in an on-screen representation on the visual display unit in response to a respective user input.

In one embodiment of the method according to the first aspect of the present invention, the method may further comprise:

before requesting the user sign-in in step 3:
    requesting, by the control unit, a user log-in, said user log-in request being displayed in a sixth on-screen representation on the visual display unit;
    entering a user log-in via a user input into the input unit.

The user log-in request may be displayed before step 1 of the method in one embodiment. In such an example, the first on-screen representation according to step 1 may be only displayed upon a successful user log-in operation. In another embodiment, the user log-in request may be displayed after step 1 and before step 2 of the method. In both examples, requesting removal of the validated status of the selected product in step 2 is only possible after a successful user log-in. This leads to a further protection of the product settings as the user must first carry out a successful log-in operation, and then perform a user sign-in operation in order to remove the validated status.

Entering the user log-in may be via entering user log-in data via a respective user input into the input unit in one embodiment. In one example, the user log-in data of the user may be identical to the sign-in data of the user. Alternatively, in another example, the user log-in data may be different from the user sign-in data. In one example, the user log-in data may comprise a username. Additionally, or alternatively, the user log-in data may comprise a password in one example. In one embodiment, the sign-in in step 4 may not be allowed for all users who are allowed to log into the system via a user log-in. That is, there may be a hierarchy of different user access rights to the system. For example, there may be four levels of user access rights. For example, the fourth and lowest level of user access rights may be the right to log in as a user. The third level of access rights (second lowest level of access rights) may be the right for user sign-in. The next level on the hierarchy may be validator rights, and the highest level of rights may be administrator rights. In one embodiment, the administrator may assign and withdraw the different access rights, e.g., by a respective input into the input unit.

In one embodiment of the method according to the first aspect of the present invention, the method may further comprise:

storing product settings and the associated validation status of at least one stored product on an electronic product settings storage medium;
    in response to the successful user sign-in operation of step 5, permitting a read access to the product settings associated with the selected product stored on the electronic product settings storage medium and displaying a seventh on-screen representation of the product settings associated with the selected product on the visual display unit. A "stored product" is defined as a product for which the product settings and the associated validation status are stored on the electronic product settings storage medium. The validation status may include the validated status and the unvalidated status, but is not limited to this. In one example, the product settings may then be loaded for use in the operation of the product inspection system, i.e., for the inspection of a product. The electronic product settings storage medium may be identical to the electronic event log storage medium, or it may be different from the electronic event log storage medium in one embodiment. In one example, the electronic product settings storage medium may be permanently affixed to the product inspection system, e.g., as a hard disc. In an alternative embodiment, the electronic product settings storage medium may be a removable storage medium, e.g., a USB stick. In one embodiment, the electronic product setting storage medium may be a cloud storage. At least some of the stored product settings and the associated validation status may, for example, have been stored by a manufacturer of the product inspection system or some other competent authority prior to the shipment of the product inspection system to a customer. The product settings and the validation status of a stored product may be stored in a product library in one embodiment. In one example, the product settings and the associated validation status may be stored in a data base. The product settings and the associated validation status may be stored in an encrypted form in one embodiment. The seventh on-screen representation may be displayed upon a respective user input into the input unit in one embodiment.

In one example, the method may further comprise:

in response to the validation request operation, permitting a write access to the electronic product settings storage medium and recording the modified product settings on the electronic product settings storage medium. In this way, the new validated product settings are saved on the electronic product settings storage medium. The electronic product settings storage medium may comprise a database in one embodiment. The database may comprise the product settings and the associated validation status in one example. In one example, the modified product settings may replace the former product settings associated with the selected product before the modification. In another example, the modified product settings may be recorded in addition to the product settings of the selected product before the modification.

In one embodiment of the method according to the first aspect of the present invention, the method may further comprise:

before step 1, displaying a visualization of the stored products for selection by the user in an eighth on-screen representation on the visual display unit; and
    selecting one of the visualized stored products by the user as the selected product via a selection input of the user into the input unit. In this way, the user may select product settings of products stored on the electronic product settings storage medium.

In one example, the visualization of the stored product may be displayed together with a visualization of the validation status associated with the stored product in the eighth on-screen representation.

In one embodiment of the method according to the first aspect of the present invention, the method may further comprise:

providing a subject product to the product inspection system;

requesting inspection of the subject product via an inspection input of the user into the input unit, said inspection request causing the radiation unit, by control of the electronic control unit, to impinge radiation onto the subject product, followed by detecting the radiation transmitted through or reflected from said subject product by the detector unit;

creating image data of the subject product in accordance with the detected radiation;

storing the image data and the associated validation status of the product settings used for the inspection of the subject product on an electronic image data storage medium.

In this embodiment, image data of the subject product may be created in accordance with the detected radiation. The validation status of the product settings may include the validated status and the unvalidated status. For example, the subject product may be provided to the product inspection system for inspection in a state where the validated status of the product settings associated with said subject product is displayed in an on-screen representation on the visual display unit. Then the validated status may be stored together with the image data of the inspected product on the electronic image data storage medium. Alternatively, in an example where the subject product is provided to the product inspection system in a state in which the unvalidated status of the subject product settings is displayed in an on-screen representation on the visual display unit (for example, in step 5 of the method in response to a successful user sign-in operation), the image data of the inspected product may be stored together with the associated unvalidated status on the electronic image data storage medium. The electronic image data storage medium may be part of the product inspection system in one embodiment. The electronic image data storage medium may be identical to the electronic product settings storage medium and/or the electronic event log storage medium in one example. Alternatively, in one example, the electronic image data storage medium, the electronic product settings storage medium and the electronic event log storage medium may be different from each other. The electronic image storage medium may be permanently affixed to the product inspection system, e.g., as a hard disc. Alternatively, the electronic image storage medium may be a removable storage medium, e.g., a USB stick. In one embodiment, the electronic image data storage medium may be a cloud storage.

In another embodiment of the method according to the first aspect of the present invention, the method may further comprise:

displaying a ninth on-screen representation of a graphical representation of the image data and the associated validation status of the product settings of an inspected product on the visual display unit upon input of a user display request by the user into the input unit. I.e., the user may access the image data and the associated validation status of the product settings stored on the electronic image data storage medium and have them displayed on the visual display unit in one example.

In some cases, it may be beneficial when product settings of the product inspection system may be exported to or imported from another system, e.g., from a second product inspection system. Thus, according to another embodiment of the method according to the first aspect of the present invention, the method may further comprise:

exporting the product settings and the associated validation status from the product inspection system and/or importing product settings and the associated validation status to the product inspection system wherein said exporting and/or importing is preferably to/from a second product inspection system, said second product inspection system comprising a second electronic control unit, a second radiation unit controlled by said second control unit for causing radiation to impinge onto a subject product, a second detector unit controlled by said second control unit for detecting the radiation transmitted through or reflected from said subject product, a second visual display unit in communication with said second control unit and a second input unit in communication with said second control unit, said second product inspection system being preferably operable according to the method according to the first aspect of the present invention. I.e., according to this embodiment it is possible to export and/or import the product settings together with the associated validation status to/from a second product inspection system.

According to a second aspect of the present invention, there is provided a product inspection system, said product inspection system comprising an electronic control unit, a radiation unit controlled by said control unit for causing radiation to impinge onto a subject product, a detector unit controlled by said control unit for detecting the radiation transmitted through or reflected from said subject product, a visual display unit in communication with said control unit and an input unit in communication with said control unit, said product inspection system being operable according to the method according to the first aspect of the present invention.

Everything that was said above in relation to the method according to the first aspect of the present invention also applies to the product inspection system according to the second aspect of the present invention.

In particular, the product inspection system may comprise an electronic event log storage medium and/or an electronic product settings storage medium and/or an electronic image data storage medium in one embodiment. The product inspection system may comprise a belt conveyor for conveying the subject product in one embodiment.

In one embodiment, the product inspection system may include an X-ray inspection system. I.e., the radiation emitted by the radiation unit may be X-ray radiation, and the detector unit may be adapted to detect the X-ray radiation.

According to a third aspect of the present invention, there is provided a computer program, said computer program comprising instructions which, when the computer program is carried out on a computer, cause the computer to carry out the method according to the first aspect of the present invention on a product inspection system according to the second aspect of the present invention.

BRIEF DESCRIPTION OF DRAWINGS

In the following description, the invention will be described in greater detail by way of examples, with reference to the drawings.

FIG. 2 depicts an example of a first on-screen representation according to step 1 of the method according to the first aspect of the present invention, FIG. 3 depicts an example of an on-screen representation of an unvalidated status of the product settings of the selected product, FIG. 4 depicts an example of an on-screen representation related to denying access to the validated product settings upon a user request, FIG. 8 depicts a first example of a ninth on-screen representation of a graphical representation of image data of a product which was inspected using product settings with an unvalidated status, FIG. 9 depicts an example of an on-screen representation related to the restoration of product settings, FIG. 10 depicts an example of a fifth on-screen representation of the validated status of the restored product settings, FIG. 14 depicts an example of an on-screen representation of the validation status of product settings associated with certain products, FIG. 15 depicts an example of an on-screen representation of data stored in an event log.

DESCRIPTION OF EMBODIMENTS

Figure 1:
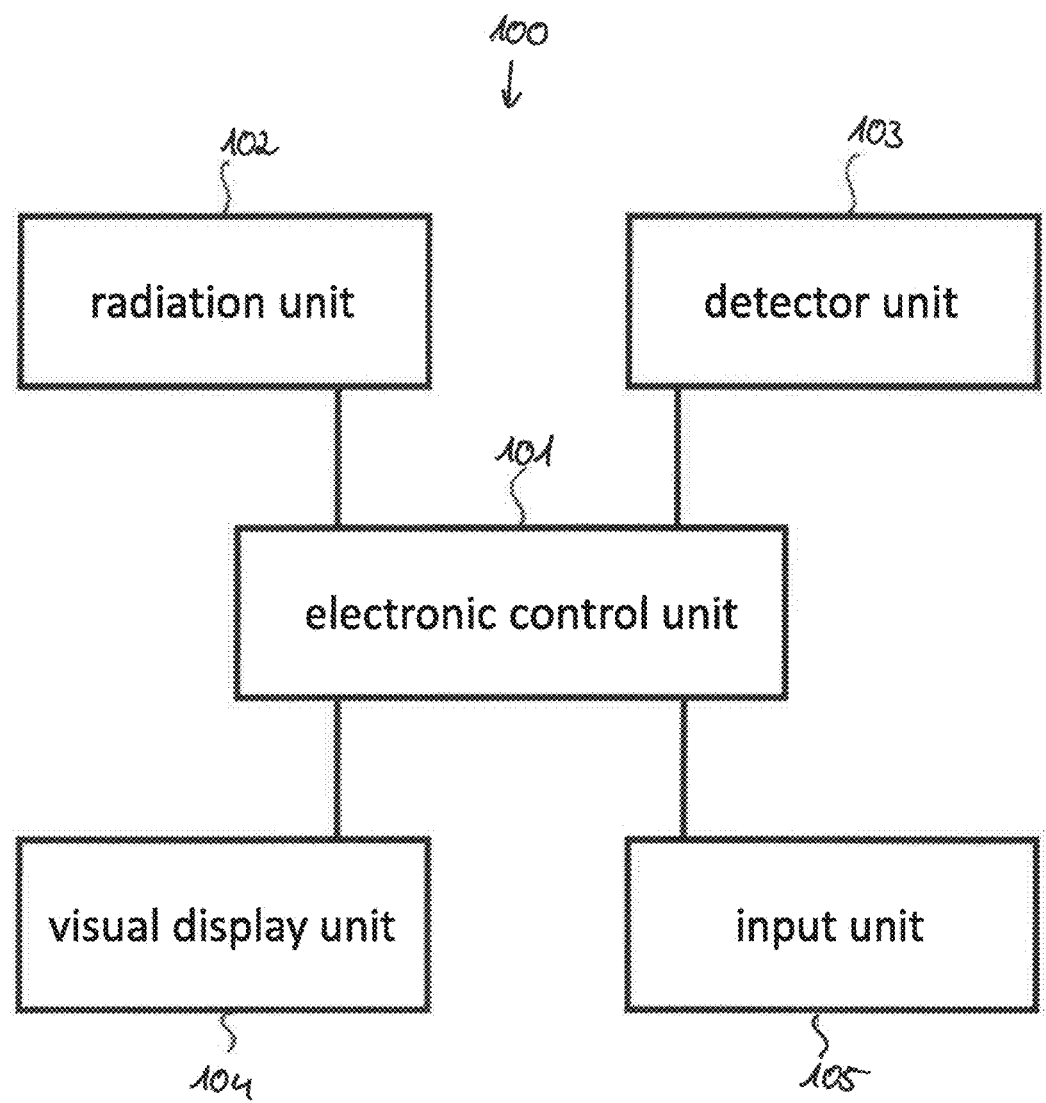
FIG. 1 depicts a schematic representation of an embodiment of the product inspection system according to the second aspect of the present invention.

FIG. 1 depicts a schematic representation of an embodiment of a product inspection system 100 according to the second aspect of the present invention. The product inspection system 100 may be used, for example, in the food industry for the detection of contaminants in a product. The product inspection system 100 comprises an electronic control unit 101, a radiation unit 102 controlled by said control unit for causing radiation to impinge onto a subject product and a detector unit 103 controlled by said control unit for detecting the radiation transmitted through or reflected from said subject product.

The radiation emitted by the radiation unit 102 may be, for example, X-ray radiation, infrared radiation, near infrared radiation, or any other radiation suitable for product inspection. The detector is adapted to detect the radiation transmitted through or reflected from said subject product. In one embodiment, image data of the subject product may be created in accordance with the detected radiation.

Furthermore, the product inspection system 100 comprises a visual display unit 104 in communication with said control unit 101 and an input unit 105 in communication with said control unit 101. In one example the visual display unit 104 and the input unit 105 may be realized by or comprise a touch screen. However, the invention is not limited to this. In one embodiment, the product inspection system 100 may further comprise an electronic event log storage medium and/or an electronic product settings storage medium and/or an electronic image data storage medium. The product inspection system 100 shown in FIG. 1 is adapted to carry out the method according to the first aspect of the present invention.

In the following, an example of the method according to the first aspect of the present invention will be explained with reference to FIGS. 2 to 17. The method may be carried out, e.g., by using the product inspection shown in FIG. 1. The on-screen representations shown in these figures are displayed on the visual display unit. The visual display unit may comprise or may be part of a touch screen in one embodiment.

The method may preferably start with requesting, by the control unit, a user log-in, said user log-in request being displayed in a sixth on-screen representation (not shown in the figures) on the visual display unit. A user enters a user log-in via a user input into the input unit. For example, the user may enter a username and a password as the user log-in.

The method may preferably comprise storing product settings and the associated validation status (including a validated or an unvalidated status) of at least one stored product on an electronic product settings storage medium. Then, in response to a successful user log-in operation, a visualization of the stored products for selection by the user may be displayed in an eighth on-screen representation (not shown) on the visual display unit. The validation status associated with each of the visualized products may also be displayed together with a visualization of the respective stored product on the visual display unit. The user selects one of the visualized products having associated validated product settings as the selected product via a selection input into the input unit.

The method continues with step 1:
displaying a first on-screen representation 1 (see FIG. 2) of the validated status of the validated product settings of the selected product on the display unit and denying access for modifying at least one of the product settings associated with the selected product. The selected product is identified via the icon 2 as "Apple Pies". The validated status is illustrated via the icon 3 in FIG. 1 which may, e.g., by a green shield. The logged-in user is identified via the icon 5 as "Supervisor" in FIG. 2. An example of an on-screen representation 1a of an unvalidated status illustrated by an icon 4 (e.g., a red shield with a cross) is shown in FIG. 3.

In case that the user tries to modify at least one of the product settings with a validated status via a user input, an on-screen representation 6 of denying access to the product settings is displayed on the visual display unit in one embodiment (see FIG. 4 for an example).

Figure 5:
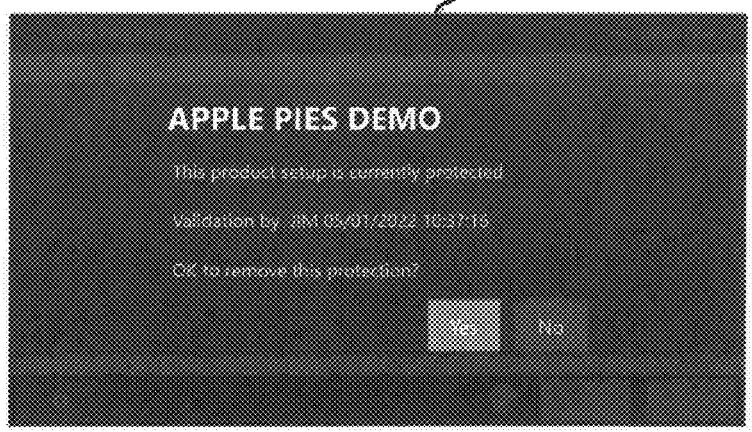
FIG. 5 depicts an example of an on-screen representation related to the removal of the validated status.

The method continues with step 2:
the user requests removal of the validated status via a respective user input into the input unit. For example, the user may click on the icon 3 representing the validated status (see FIG. 2 or FIG. 4). In response to the removal request, an on-screen representation 7 related to the removal of the validated status as it is shown, e.g., in FIG. 5 may be displayed on the visual display unit in one embodiment. As it is shown in FIG. 5, the on-screen representation 7 shows that the product settings are currently protected against modifications. ("This product setup is currently protected.") Removal of the protection may be requested via a user input (selecting "Yes" in FIG. 5).

Figure 6:
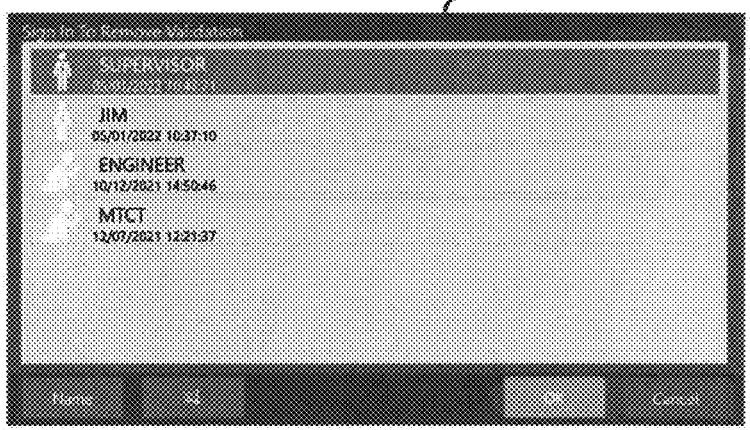
FIG. 6 depicts an example of a second on-screen representation related to a user sign-in request.

The method then proceeds with step 3:

requesting, by the control unit, in response to the removal request, a user sign-in, said user sign-in request being displayed in a second on-screen representation 8 on the visual display unit, as it is shown, for example, in FIG. 6. In FIG. 6, names identifying different users of the product inspection system, namely "SUPERVISOR", "JIM", "ENGINEER", "MTCT" are shown.

The user may now perform step 4:

Entering a user sign-in via a user input into the input unit. In the example shown in FIG. 6, the users may select their name among the displayed ones and press "OK". Additionally, the user may enter a password in one embodiment. Then, the user has signed in.

Figure 7:
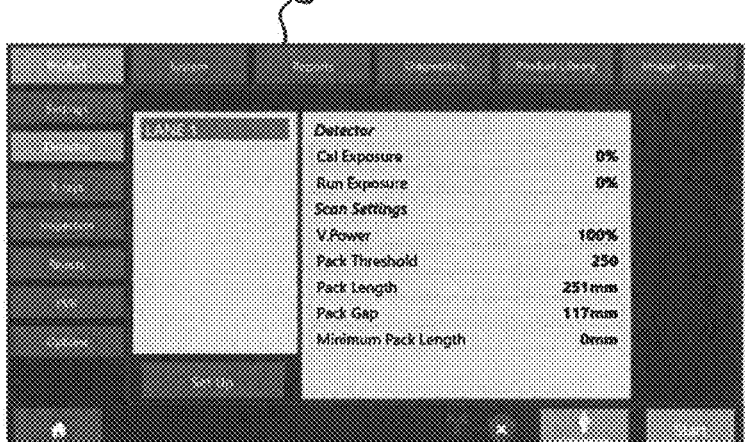
FIG. 7 depicts an example of a third on-screen representation of an unvalidated status of the products settings of the selected product.
Figure 11:
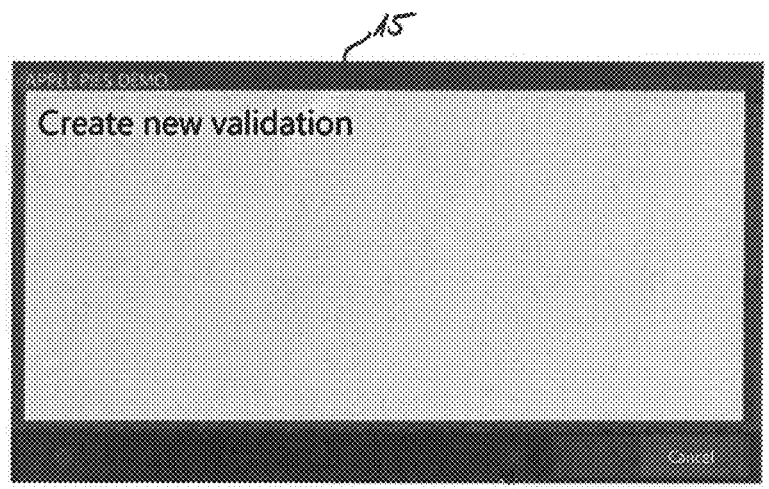
FIG. 11 depicts an example of an on-screen representation related to the creation of a new validation.
Figure 12:
FIG. 12 depicts an example of a fourth on-screen representation of the validated status of the product settings after the creation of the new validation.

Then, the method proceeds with step 5:

In response to a successful user sign-in operation, a third on-screen representation 9 of an unvalidated status of the product settings associated with the selected product is displayed on the visual display unit and access for modifying at least one of the product settings associated with the selected product is permitted. An example of a third on-screen representation 9 is shown in FIG. 7. In FIG. 7, the icon 4 of the unvalidated status is displayed. The user may now access various product settings, for example, settings regarding the detector, the radiation unit (X-rays), and so forth. The product settings may now be tweaked and tuned to arrive at a set of modified product settings.

Preferably, the method further comprises displaying a ninth on-screen representation of a graphical representation of image data created in accordance with the detected radiation and the associated validation status of the product settings of an inspected product on the visual display unit upon input of a user display request into the input unit. FIG. 8 depicts a first example of such a ninth on-screen representation 10. A graphical representation 11 of image data of an inspected product is displayed. Furthermore, the associated unvalidated status of the product settings used when inspecting the product to thereby obtain the image data is displayed via a symbol 12. That is, it is possible to operate the product inspection system with product settings having an unvalidated status (e.g., after the sign-in operation of step 4 resulting in unvalidated product settings in step 5). Then, image data of a subject product inspected in a state of the product inspection system where the product settings have an unvalidated status may be stored together with said unvalidated status and may be displayed together with the unvalidated status on the visual display unit.

After the access permission of step 5, at least one of the product settings associated with the selected product may be modified via an input into the input unit in step 6. Then, there are two options for the modified unvalidated product settings. If the modified product settings are not required long term, then it may be desirable that the product settings before the modification, that is, the validated product settings before the modification are restored. This may be achieved, for example, by the user clicking on the icon 4 in FIG. 7. As a response, an on-screen representation 13 related to the restoration of product settings shown in FIG. 9 may be displayed on the visual display unit in one example. The user may confirm that the validated product settings before the modification are to be restored by a user input. In response to this restoration request, a fifth on-screen representation 14, as shown e.g., in FIG. 10, of a validated status of the restored product settings of the selected product may be displayed on the visual display unit and access for modifying at least one of the product settings associated with the selected product may be denied.

Alternatively, the modified product settings may be deemed to be required long term. Then the product settings may be revalidated. To this end, after the modification of the at least one of the product settings in step 6, an authorized validator having validator rights must be logged in. For the log-in, the validator enters a validator log-in via the input unit. For example, the validator may log in after the modification of step 6. In one example, the validator enters a username and/or a password. After a successful validator log-in operation, the validator may request the creation of a new validation via entering a validation request into the input unit. For example, the validator may click on the icon 4 representing the unvalidated status in FIG. 7. In response, an on-screen representation 15 related to the creation of such a new validation may be displayed on the visual display unit. The validator may confirm the creation of the new validation by clicking on "Create new validation". In response to this validation request operation, a fourth on-screen representation 16 of the validated status of the modified product settings of the selected product may be displayed on the visual display unit, as it is shown e.g., in FIG. 12, and access for modifying at least one of the product settings associated with the selected product is denied.

Figure 13:
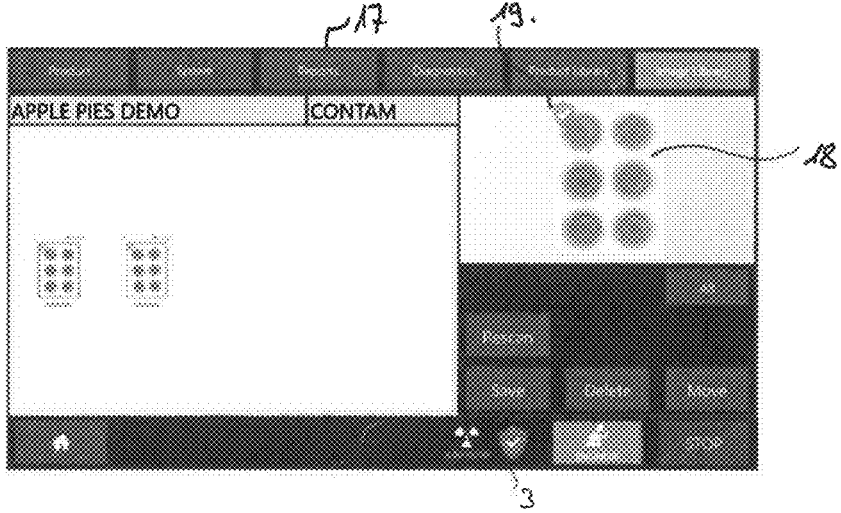
FIG. 13 depicts a second example of a ninth on-screen representation of a graphical representation of image data of a product which was inspected using product settings with a validated status.

FIG. 13 depicts a second example of a ninth on-screen representation 17 of a graphical representation 18 of image data of an inspected product created in accordance with the detected radiation and the associated validated status illustrated by a symbol 19. The image data is obtained by inspecting a product using validated product settings.

In one embodiment of the method according to the present invention, product settings and the associated validation status (including a validated and an unvalidated status) of at least one product may be stored on an electronic product settings storage medium. The product settings may be stored in a database stored on the electronic product settings storage medium in one example. The names of the products and the associated validation status may be displayed in an on-screen representation 19 on the visual display unit upon a respective user request as it is shown for example in FIG. 14. In FIG. 14, various product names 20a-20f are displayed. A validated status is indicated with a symbol 21 (green shield in FIG. 14).

The method according to the first aspect of the present invention may, in one example, comprise storing data identifying the user and/or the validator who has been modifying and/or restoring and/or validating the product settings and/or changing the validation status of the product settings in an event log 23 on an electronic event log storage medium. An on-screen representation 22 of such an event log 23 is shown in FIG. 15. The first column of the event log 23 represents a time (time stamp). The second column of the event log 23 represents the name of a user and/or validator who performed an operation on the product settings (including modifying and/or restoring and/or validating the product settings and/or changing the validation status of the product settings). The third and fourth column of the event log 23 represent operations carried out by the user and/or validator.

Figure 16:
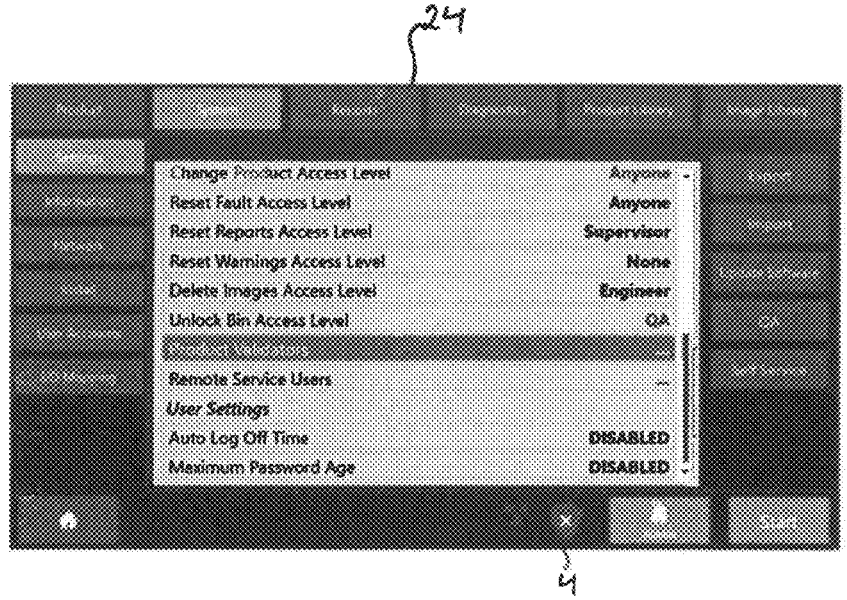
FIG. 16 depicts an example of an on-screen representation related to assigning validator rights to a user.
Figure 17:
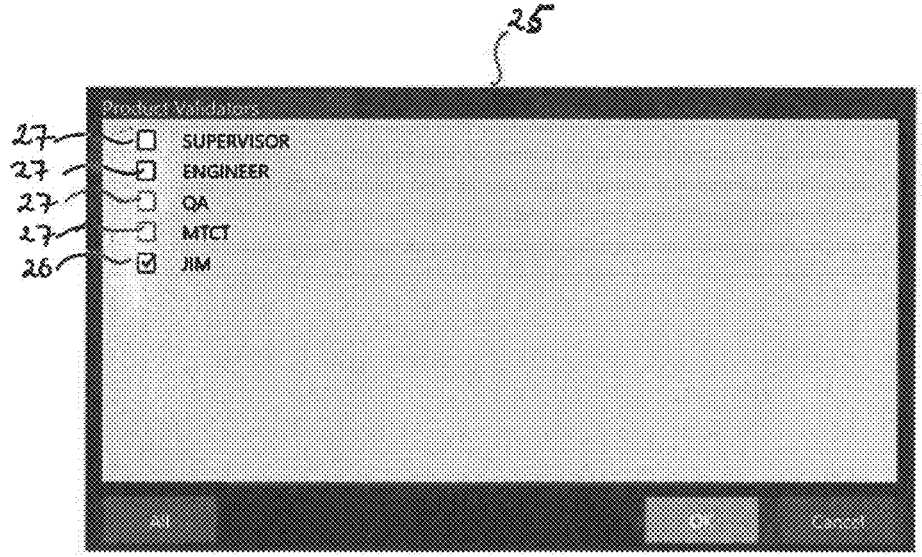
FIG. 17 depicts an example of another on-screen representation related to assigning validator rights to a user.

In one embodiment of the method according to the first aspect of the present invention, the method may further comprise assigning validator rights to and/or withdrawing validator rights from at least one user by an authorized administrator via an input into the input unit. On-screen representations 24, 25 related to assigning or withdrawing the validator rights are shown in FIGS. 16 and 17. In FIG. 16, an example of an on-screen representation 25 of a menu including an option to assign or withdraw validator rights via selecting "Product Validators" is displayed. When clicking "Product Validators", a list of possible Product Validators is displayed in an on-screen representation 25 shown as in FIG. 17. Here, "Jim" is assigned validator rights as indicated by the checked box 26 in FIG. 17. "Supervisor", "Engineer", "QA" and "MTCT" do not have validator rights, as it is indicated by the unchecked boxes 27. The administrator may assign and/or withdraw validator rights by checking/unchecking the boxes 26, 27.

Figure 18:
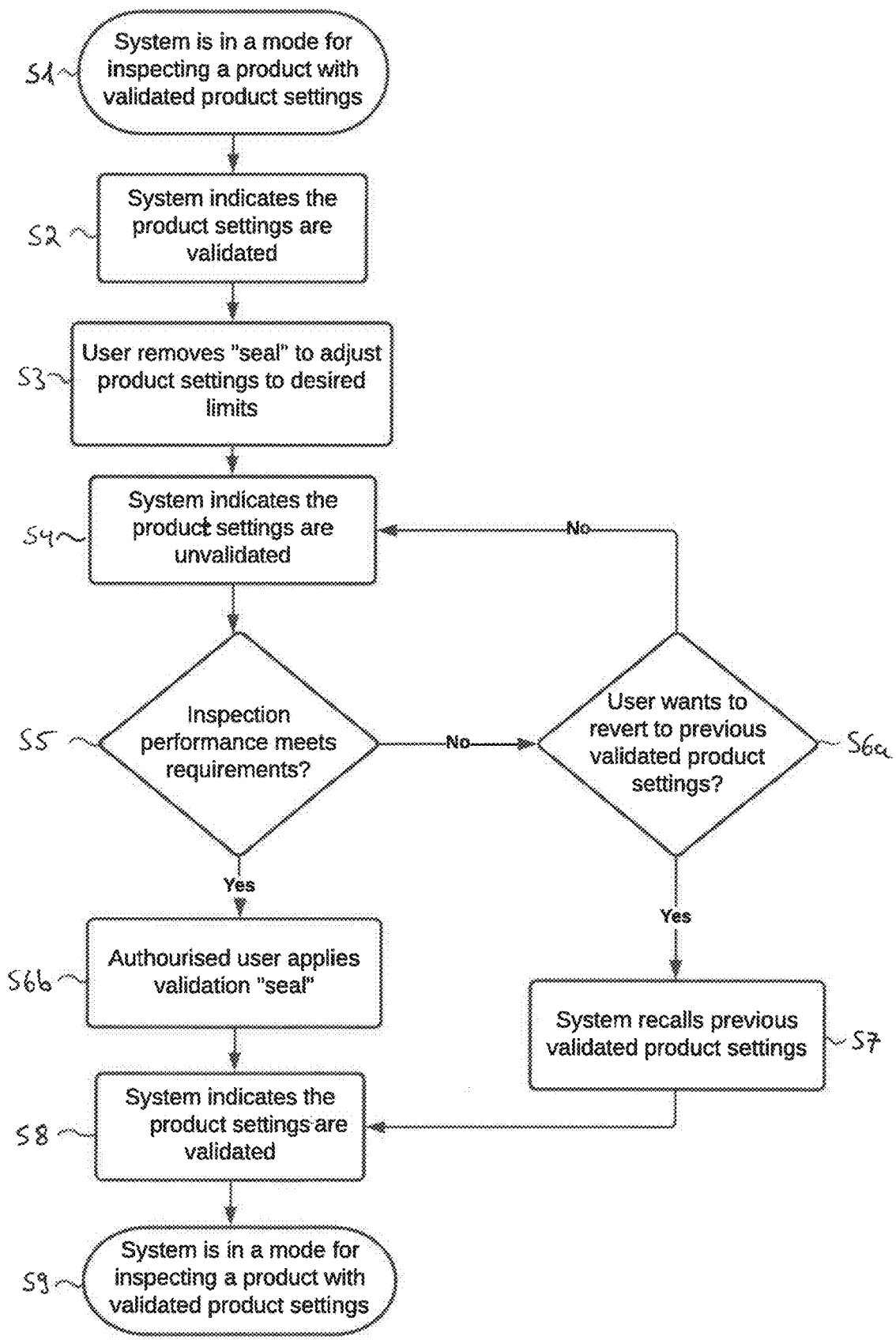
FIG. 18 depicts a flowchart of an embodiment of the method according to the first aspect of the present invention.

FIG. 18 depicts a flowchart of an embodiment of the method according to the first aspect of the present invention. The system is in a mode for inspecting a product with associated validated product settings (S1). For example, for a plurality of stored products the respective product settings and their associated validation status may have been stored on an electronic product setting storage medium, a visualization of the stored products for selection by the user may have been displayed in an eighth on-screen representation on the visual display unit and the user may have selected one of the visualized stored products as the selected product via a selection input of the user into the input unit.

Then, a validated status of the validated product settings associated with the selected product may be displayed in a first on-screen representation on the visual display unit (S2) and access for modifying at least one of the validated product settings associated with the selected product may be denied. That is, the validated product settings may be "sealed".

Then, at S3, the user removes the "seal" to adjust the product settings to the desired limits. That is, the user may request removal of the validated status via a user input into the input unit. In response to the removal request, the electronic control unit may request a user sign-in, said user sign-in request being displayed in a second on-screen representation on the visual display unit. The user may then enter a user sign-in via a user input into the input unit.

Then, at S4, in response to a successful user sign-in operation, a third on-screen representation of an unvalidated status of the product settings associated with the selected product may be displayed on the visual display unit and access for modifying at least one of the product settings associated with the selected product may be permitted. The user may then modify at least one of the product settings associated with the selected product by a user input into the input unit.

After modifying at least one of the product settings, it may be verified whether the performance of the inspection system operated with the modified product settings meets the desired requirements (S5). That is, a validation of the product inspection system may be carried out.

If the inspection performance meets the desired requirements, an authorized user may apply a validation "seal" at S6b. The authorized user may be a validator. To this end, the authorized validator having validator rights logs in by entering a validator log-in via an input into the input unit. After a successful log-in operation of the validator, the validator requests the creation of a new validation by entering a validation request into the input unit.

In response to the validation request operation, a fourth on-screen representation of the validated status of the modified product settings of the selected product is displayed on the visual display unit at S8. Access for modifying at least one of the product settings associated with the selected product is denied.

Then, at S9, the system is in a mode for inspecting a product with validated product settings.

In case that, at S5, the performance of the product inspection system does not meet the desired requirements, the users may decide whether they want to revert to the previously validated product settings or not at S6a. If the answer is No, the method returns to S4.

If the answer is Yes, the system recalls the previously validated product settings at S7. That is, after the modification of the at least one of the product settings, the validated product settings before the modification are restored. Then, the system proceeds with S8 and S9 as explained above.

Figure 19:
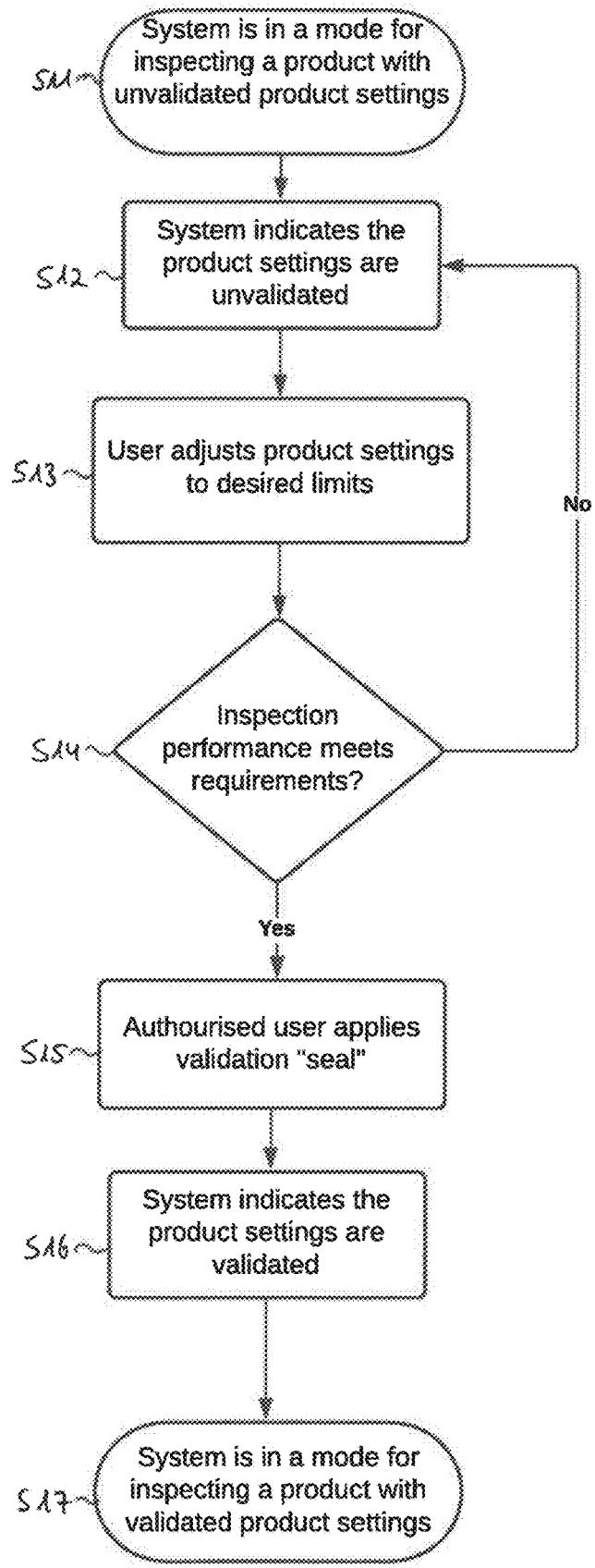
FIG. 19 depicts a flowchart related to the creation of a new validation of product settings.

FIG. 19 depicts a flowchart related to the creation of a new validation of product settings. At S11, the system is in a mode for inspecting a product with unvalidated product settings. For example, the stored products may be displayed for selection by the user in an eighth on-screen representation on the visual display unit together with the associated validation status, and the user may select a product with associated unvalidated status via a selection input into the input unit.

Then, the system indicates that the product settings are unvalidated at S12. Access for modifying the product settings may be permitted. At S13, the user adjusts the product settings to desired limits. Then, at S14, it is verified whether the desired inspection performance is achieved. If the answer is No, the method returns to S12. If the answer is Yes, an authorized user, e.g., a validator, applies a validation "seal" at S15. That is, an authorized validator having validator rights logs in by entering a validator log-in via an input into the input unit. After a successful log-in operation of the validator, the validator requests the creation of a new validation by entering a validation request into the input unit. In response to the validation request operation, a fourth on-screen representation of the validated status of the modified product settings is displayed at S16, and access for modifying at least one of the product settings associated with the selected product is denied.

Then, at S17, the system is in a mode for inspecting a product with the validated product settings.

101 Electronic control unit
102 Radiation unit
103 Detector unit
104 Visual display unit
105 Input unit
1, 1a, 6-10, 12-17, 19, 22, 24, 25 on-screen representation
2 Selected product icon
3 Validated status icon
4 Unvalidated status icon
5 Logged-in user icon
11, 18 Graphical representation
12 Associated unvalidated status symbol
20a, 20b, 20c, 20d, 20e, 20f Product names
21 Validated status symbol
23 event log

The invention claimed is:
1. A method for handling product settings of operating parameters of a product inspection system, said method comprising:

providing said product inspection system comprising:
  an electronic control unit,
    a radiation unit controlled by said control unit for causing radiation to impinge onto a subject product,
    a detector unit controlled by said control unit for detecting the radiation transmitted through, or reflected from, said subject product,
    a visual display unit in communication with said control unit, and
  an input unit in communication with said control unit;
  operating the product inspection system in a validated status mode including displaying a first on-screen representation of a validated status of validated product settings associated with a selected product at the visual display unit including a visual indicator of the validated status and denying access for modifying at least one of the validated product settings associated with the selected product;
  receiving a request, via user input at the input unit, for removal of the validated status mode, thereby permitting access for modifying at least one of the product settings associated with the selected product;
  requesting, by way of the electronic control unit, in response to the removal request, a user sign-in;
  displaying said user sign-in request in a second on-screen representation at the visual display unit;
  receiving a successful user sign-in operation via user input at the input unit;
  in response to the successful user sign-in operation, operating the product inspection system in an unvalidated status mode including displaying a third on-screen representation of an unvalidated status of the product settings associated with the selected product at the visual display unit and permitting access for modifying at least one of the product settings associated with the selected product.

2. The method according to claim 1, further comprising:
while operating the product inspection system in the unvalidated status mode, receiving modifications to at least one of the product settings associated with the selected product by way of user input at the input unit; and
modifying the at least one of the product settings associated with the selected product in accordance with the user input at the input unit.

3. The method according to claim 2, further comprising:
after modifying the at least one of the product settings associated with the selected product, restoring the validated product settings before the modification, displaying a further on-screen representation of the validated status of the restored validated product settings associated with the selected product at the visual display unit and denying access for modifying at least one of the validated product settings associated with the selected product.

4. The method according to claim 2, further comprising:
after modifying the at least one of the product settings associated with the selected product, receiving a successful log-in operation of an authorized validator having validator rights by way of a validation log-in via an input at the input unit;
after the successful log-in operation of the validator, receiving a request for a creation of a new validation by the validator by way of a validation request entered at the input unit;
in response to the validation request operation, displaying a further on-screen representation of the validated status of the modified product settings of the selected product at the visual display unit and denying access for modifying at least one of the product settings associated with the selected product.

5. The method according to claim 4, further comprising:
assigning validator rights to, and withdrawing validator rights from, at least one user by way of the electronic control unit following in response to input from an authorized administrator entered at the input unit.

6. The method according to claim 1, further comprising:
storing data identifying the user or validator who has been modifying or restoring or validating the product settings or changing the validation status of the product settings in an event log on an electronic event log storage medium.

7. The method according to claim 1, further comprising:
before requesting the user sign-in:
requesting, by the electronic control unit, a user log-in, comprising displaying said user log-in request at a further on-screen representation at the visual display unit; and
receiving a user log-in by way of user input at the input unit.

8. The method according to claim 1, further comprising:
storing product settings and the associated validation status of at least one stored product on an electronic product settings storage medium; and
in response to the successful user sign-in operation, permitting read access to the product settings associated with the selected product stored on the electronic product settings storage medium and displaying a further on-screen representation of the product settings associated with the selected product at the visual display unit.

9. The method according to claim 8, further comprising:
in response to the validation request operation, permitting write access to the electronic product settings storage medium and recording the modified product settings on the electronic product settings storage medium.

10. The method according to claim 8, further comprising:
before displaying the first on-screen representation of the validated status of validated product settings, displaying a visualization of the stored products for selection by the user in a further on-screen representation at the visual display unit; and
receiving a selection of one of the visualized stored products by the user as the selected product via a selection input of the user at the input unit.

11. The method according to claim 1, further comprising:
providing a subject product to the product inspection system;
receiving an inspection request, by way of user input at the input unit, for inspection of the subject product via an inspection input;
in response to receipt of said inspection request, causing the radiation unit, by control of the electronic control unit, to impinge radiation onto the subject product, and subsequently detecting the radiation transmitted through or reflected from said subject product by the detector unit;
creating image data of the subject product in accordance with the detected radiation; and
storing the image data and the associated validation status of the product settings used for the inspection of the subject product on an electronic image data storage medium.

12. The method according to claim 1, further comprising:
displaying a further on-screen representation of a graphical representation of image data and the associated validation status of the product settings of an inspected product at the visual display unit after receiving a user display request by user input at the input unit.

13. The method according to claim 1, further comprising:
exporting the product settings and the associated validation status from the product inspection system and importing product settings and the associated validation status to the product inspection system, wherein said exporting and importing is provided to and from a second product inspection system, said second product inspection system comprising:
a second electronic control unit,
a second radiation unit controlled by said second control unit for causing radiation to impinge onto a subject product,
a second detector unit controlled by said second control unit for detecting the radiation transmitted through or reflected from said subject product,
a second visual display unit in communication with said second control unit, and
a second input unit in communication with said second control unit.

14. A product inspection system, said product inspection system comprising:
an electronic control unit,
a radiation unit controlled by said control unit for causing radiation to impinge onto a subject product,
a detector unit controlled by said control unit for detecting the radiation transmitted through or reflected from said subject product,
a visual display unit in communication with said control unit, and
an input unit in communication with said control unit,
said product inspection system configured to:
display a first on-screen representation of a validated status of validated product settings associated with a selected product at the visual display unit comprising a visual indicator of the validated status and deny access for modifying at least one of the validated product settings associated with the selected product;
receive, by way of user input at the input unit, a request to remove the validated status and thereby permitting modification of at least one of the product settings associated with the selected product;
request, by the electronic control unit, in response to the removal request, a user sign-in, including displaying said user sign-in request in a second on-screen representation at the visual display unit;
receive, by way of user input at the input unit, a user sign-in;
in response to receipt of a successful user sign-in operation, remove the validated status, display a third on-screen representation of an unvalidated status of the product settings associated with the selected product at the visual display unit, and permit access for modifying the at least one of the product settings associated with the selected product.

15. A product inspection system comprising:
an electronic control unit,
a radiation unit controlled by said control unit for causing radiation to impinge onto a subject product,
a detector unit controlled by said control unit for detecting the radiation transmitted through or reflected from said subject product,
a visual display unit in communication with said control unit, and
an input unit in communication with said electronic control unit,
said electronic control unit comprising software instructions, which when executed, configure the control unit to:
display, at the visual display unit, a first on-screen representation of a validated status of validated product settings associated with a selected product, comprising a visual indicator indicating the validated status,
while the validated status is in place, deny modifications to at least one of the validated product settings associated with the selected product;
receive a request, by way of user input at the input unit, for removal of the validated status to modify at least one of the product settings associated with the selected product;
display, at a second on-screen representation at the visual display unit and in response to the removal request, a request for a user sign-in;
receive, by way of user input at the input unit, a user sign-in;
in response to a successful user sign-in operation, display, at a third on-screen representation at the visual display unit, an unvalidated status of the product settings associated with the selected product; and
while the unvalidated status is in place, permit modifications to the at least one of the product settings associated with the selected product.

* * * * *

UNITED STATES PATENT AND TRADEMARK OFFICE
CERTIFICATE OF CORRECTION

PATENT NO. : 12,523,994 B2
APPLICATION NO. : 18/115808
DATED : January 13, 2026
INVENTOR(S) : Nick Bridger Page 1 of 1

It is certified that error appears in the above-identified patent and that said Letters Patent is hereby corrected as shown below:

In the Specification

In Column 16, after Line 48, please insert the following two lines:
-- Reference signs list
100 Product inspection unit --.

In Column 16, after Line 63, please insert the following two lines:
-- 26 Checked box
27 Unchecked boxes --.

Signed and Sealed this
Tenth Day of February, 2026

John A. Squires
*Director of the United States Patent and Trademark Office*